July 28, 1964 S. A. DIER 3,142,117
APPARATUS FOR MACHINING A SPHERICAL SURFACE
Filed Aug. 23, 1962
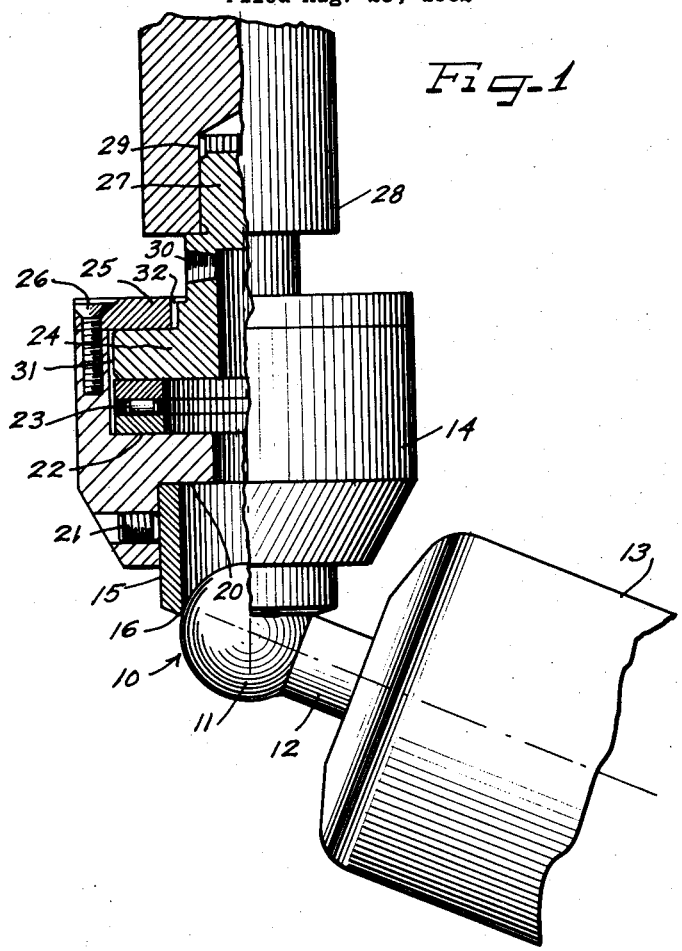
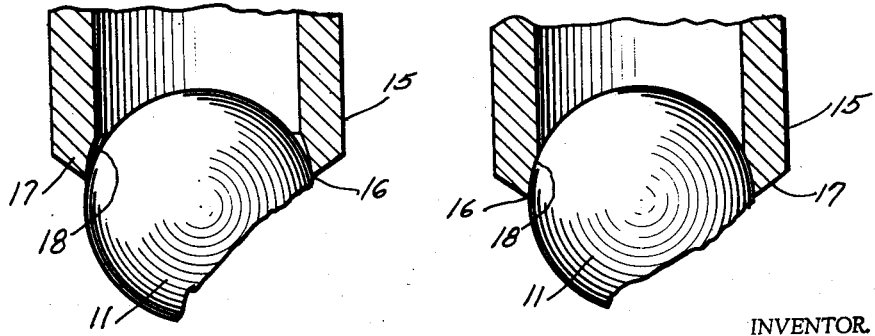
INVENTOR.
Stephen A. Dier
BY
ATTORNEYS 3,142,117
APPARATUS FOR MACHINING A SPHERICAL
SURFACE
Stephen A. Dier, Warren, Mich., assignor to Thompson Ramo Wooldridge Inc., Cleveland, Ohio, a corporation of Ohio
Filed Aug. 23, 1962, Ser. No. 219,054
6 Claims. (Cl. 29—566)

This invention relates to the machining of a spherical surface such as that present on a ball stud adapted for use in automobiles and the like.

An object of this invention is to provide an improved apparatus for machining a spherical surface wherein the same cutting tool can be used both for generating a spherical surface and for burnishing that surface after it is cut.

Another object of the invention is to provide in the aforesaid apparatus for the floating of the tool both axially and transversely so as to cause the tool to self-align itself with the spherical surface and to generate a true spherical surface.

A further object of this invention is to provide an improved simplified economical method of machining a spherical surface on a stud.

Still another object of the invention is to provide an apparatus for cutting and burnishing a spherical surface wherein a novel cutting tool can be associated in a novel arrangement with standard work and tool holders or spindles of a machine lathe or the like.

Another feature of the invention is the provision for the floating of the cutting tool in both axial and transverse directions whereby a true spherical surface can be generated on the ball being machined.

In accordance with other features of the invention, there is provided in an apparatus for machining of a spherical surface such as that of a ball stud, a cutting tool having a circular cutting edge on an end thereof and leading radially inward into a concave spherical burnishing land axially inset in said tool end and of a radius corresponding to that of the cut ultimate spherical surface, and relatively rotatable holders for the ball joint stud and the cutting tool and at least one of the holders being movable in the direction of its axis and at an angle to the axis of the other holder to engage the spherical surface successively with said cutting edge and the land in the successive cutting and burnishing of the spherical surface.

A further feature of the invention is the provision of a loose but restrained fitting of the cutting tool in its holder so that the tool edge can floatingly conform to the curvature of the ball in the machining of the spherical surface of the ball.

Other objects and features of this invention will more fully appear from the following detailed description taken in conjunction with the accompanying drawings illustrating a single embodiment of the invention, and wherein:

FIGURE 1 is a somewhat diagrammatic plan view, partly in section, of an apparatus including my novel cutting tool for practicing of this invention;

FIGURE 2 is a fragmentary view of the cutting end of the tool, partly in section, and showing the cutting edge for cutting the spherical surface of the ball stud; and FIGURE 3 is a view like that of FIGURE 2, but showing the cutting tool burnishing the spherical surface of the ball of the stud.

As shown on the drawings:

The reference character 10 described generally a ball stud of the type commonly used in automobiles in conjunction with the steering or front wheels and includes the usual spherical-like ball 11 and the shank 12. The shank of the ball stud is releasably held in any suitable or conventional manner by a powered rotary spindle or work holder 13 of a conventional machine or lathe (not shown). When thus held, the ball 11 to be machined is located over the bed of the machine in a position to be engaged by an angularly disposed cutting tool 15 carried by a tool holder 14. This tool holder is adapted to be fed in the direction of its axis toward the work or ball and at an angle to the work holder 14. The motivating means may be of any conventional type such as a pneumatic cylinder (not shown) connected to the tool holder 14 which will be described more fully hereinafter.

It will be perceived that when the cutting tool 15 is engaged with the ball 11 its axis (shown by a dot and dash line) intersects at an angle the longitudinal axis (shown by a dot and dash line) of the work holder or stud. The intersection of the two dotted lines axes is at the center of the ball 11 when the tool engages the work. This tool 15 may be mounted on the tool holder for either rotation or non-rotation, if desired, with respect to the rotating powered work holder or spindle 13.

The cutting tool 15, when used in the arrangement shown, has a circular cutting edge 16 defined on its outer periphery by a radially outer frusto-conical surface 17 leading axially rearwardly from the cutting edge.

The cutting edge 16 on its radial inner side leads axially inwardly into an inset concave conical surface or land 18 for burnishing the surface after it is cut by the edge 16.

In FIGURE 2, the cutting edge 16 is shown in the process of beginning the cutting of the conical wall surface 11, whereas in FIGURE 3, the surface is shown after it is cut and bottomed against the land 18 for the burnishing of such cut spherical surface. While the tool 15 is shown in tubular form, it need not necessarily be so, as long as the concave conical land 18 is inset on the cutting end of the tool. The radius of the inner spherical land 18 is of the same radius as that which the tool generates on the spherical ball 11.

With reference to the floating feature of the cutting tool 15, it will be perceived that this subject is shown in FIGURE 1. There, the tubular cutting tool 15 is tightly seated in a recess 20 formed in one end of the holder 14. The tool is held in this recessed or cupped end of tool 14 by a set screw 21.

The other end of the holder 14 is similarly recessed or cupped at 22 and has seated therein a conventional thrust bearing or anti-frictional element 23. Supported against the bearing 23 is a headed tubular stem 24 which is held in place in the holder 14 by a cap 25 detachably fastened to holder 14 by bolts 26.

The headed tubular stem has its other end reduced at 27 for telescoping a recess in drive member 28. Reduced end 27 has a keyed or splined connection 29 with member 28 and which connection permits longitudinal or axial movement of tool holder 14 relative to drive member 28. The drive member 28 may be actuated by any suitable means such, for example, as a pneumatic cylinder (not shown).

The tubular stem 24 is hollow so that lubricant can be introduced, as desired, through opening 30. Such lubricant flows through the center of the holder 14 through the tool 15 and onto the surface being cut.

It will also be noted that the headed end of the stem 24 is spaced slightly at 31 and 32 from the wall of holder 14 and the edge of cap 25 respectively to permit lateral or transverse floating movement of holder 14. From the foregoing, it is clear that the cutting tool 15 carried by the holder 14 can have a floating movement both in an axial direction and in a transverse direction perpendicular to the axis. This enables the cutting edge 16 of tool 15 to self-align itself with the ball stud surface 11. It has been found that this floating feature permits machining of the spherical surface with minimum machining allowance on the workpiece at a minimum cycled time. Also, in allowing the tool to float under controlled pressure, it has been found that this is conducive to generating a truer spherical surface.

From the foregoing, it is clear that when the cutting tool 15 is fed transversely and angularly toward the rotating workpiece or stud 10, it will remove material from the spherical surface 11 until such surface is generated to a radius that corresponds to that of the inner spherical land 18, at which time the cutting tool will advance no further. If thereafter the tool 15 is allowed to remain in contact with the workpiece for a predetermined time under the forward pressure of the tool holder, the spherical land 18 of the tool will burnish the machined ball surface. Any suitable or appropriate lubricant may be employed to facilitate the machining and burnishing.

It is believed that my novel method of machining a spherical surface will now be fully understood from the foregoing description of an apparatus for practicing the same.

I claim as my invention:

1. In an apparatus for machining a spherical surface such as that of a ball stud, a cutting tool having a circular cutting edge on an end thereof and leading radially inward into a concave spherical burnishing land axially inset in said tool end and of a radius corresponding to that of the cut ultimate spherical surface.

2. In an apparatus for machining a spherical surface such as that of a ball stud, a cutting tool having a circular cutting edge on an end thereof and leading radially inward into a concave spherical burnishing land axially inset in said tool end and of a radius corresponding to that of the cut ultimate spherical surface, said cutting edge on its radially outer side being defined by a frusto-conical surface terminating in the outer side wall of the tool.

3. In an apparatus for the machining of a spherical surface such as that of a ball stud, a cutting tool having a circular cutting edge on an end thereof and leading radially inward into a concave spherical burnishing land axially inset in said tool end and of a radius corresponding to that of the cut ultimate spherical surface, and relatively rotatable holders for the ball joint stud and said cutting tool and at least one of said holders being movable in the direction of its axis and at an angle to the axis of the other holder to engage the spherical surface successively with said cutting edge and said land in the successive cutting and burnishing of the spherical surface.

4. In an apparatus for the machining of a spherical surface such as that of a ball stud, a cutting tool having a circular cutting edge on an end thereof and leading radially inward into a concave spherical burnishing land axially inset in said tool end and of a radius corresponding to that of the cut ultimate spherical surface, and relatively rotatable holders for the ball joint stud and said cutting tool and at least one of said holders being movable in the direction of its axis and at an angle to the axis of the other holder to engage the spherical surface successively with said cutting edge and said land in the successive cutting and burnishing of the spherical surface, said cutting tool holder having means provided therein for allowing limited restrained floating movement of the tool to self-align it with the spherical surface of the ball.

5. The structure of claim 4 further characterized by said floating being both in an axial direction and in a direction perpendicular to the axis.

6. The structure of claim 4 further characterized by the means for allowing floating including a splined connection for permitting floating in an axial direction and by a loose rotary connection in a transverse direction to the axis to permit floating of the tool in a direction perpendicular to said axis.

References Cited in the file of this patent
UNITED STATES PATENTS
1,501,690    Strong _____ July 15, 1924